United States Patent [19]

Reiterer

[11] 4,006,938

[45] Feb. 8, 1977

[54] METHOD AND APPARATUS FOR SEPARATING AND DISTRIBUTING FIBROUS MATERIALS

[75] Inventor: Ferdinand Reiterer, Lille, France

[73] Assignee: Societe Anonyme des Establissements Neu, Lille, France

[22] Filed: Aug. 27, 1975

[21] Appl. No.: 608,203

Related U.S. Application Data

[63] Continuation of Ser. No. 450,801, March 13, 1974, abandoned.

[30] Foreign Application Priority Data

Mar. 19, 1973 France .................................. 73.10223

[52] U.S. Cl. .................................. 302/59; 55/406; 55/408
[51] Int. Cl.² ......................................... B65G 53/60
[58] Field of Search .......................... 19/105, 205; 55/406–408; 214/17 CB; 241/5, 51, 56; 302/23, 28, 59–61, 11–13

[56] References Cited

UNITED STATES PATENTS

| 574,990 | 1/1897 | Griffin | 302/59 |
|---|---|---|---|
| 1,037,659 | 9/1912 | Rembert | 302/23 |
| 1,153,180 | 9/1915 | Hughes | 302/11 |
| 3,787,093 | 1/1974 | Hanselmann et al. | 302/61 |

FOREIGN PATENTS OR APPLICATIONS

| 754,670 | 8/1956 | United Kingdom | 302/59 |

Primary Examiner—Evon C. Blunk
Assistant Examiner—Jeffrey V. Nase
Attorney, Agent, or Firm—Fleit & Jacobson

[57] ABSTRACT

The invention provides a method and an apparatus for separating and collecting fibrous material in a silo having a side wall defining an interior for storing fibrous material and having an inlet and outlet, the apparatus comprising a flat disc having a perforated portion and an imperforate annular edge portion and mounted for rotation on a horizontal shaft in the interior of the silo adjacent the outlet, a driving device for rotating the disc, an inlet conduit connected to said inlet for impingement of the pneumatically conveyed air-fibrous material mixture on the disc, a suction conduit connected to said outlet and having an end edge projecting into the silo and disposed in closely spaced relationship with the imperforate annular portion of the disc, to provide, during the rotation of the disc, an aerodynamic seal formed in an annular duct defined between the annular imperforate portion of the disc, the side wall of the silo and the outer surface near the edge of the suction conduit, the suction conduit drawing the air of the air-fibrous material mixture through the disc perforations, and the combined action of the impact produced between the material and the rotary disc and the centrifugal force generated by the high rotational speed of the disc providing loosening, dispersing and eventually discharging of the fibrous materials uniformly into the silo.

6 Claims, 6 Drawing Figures

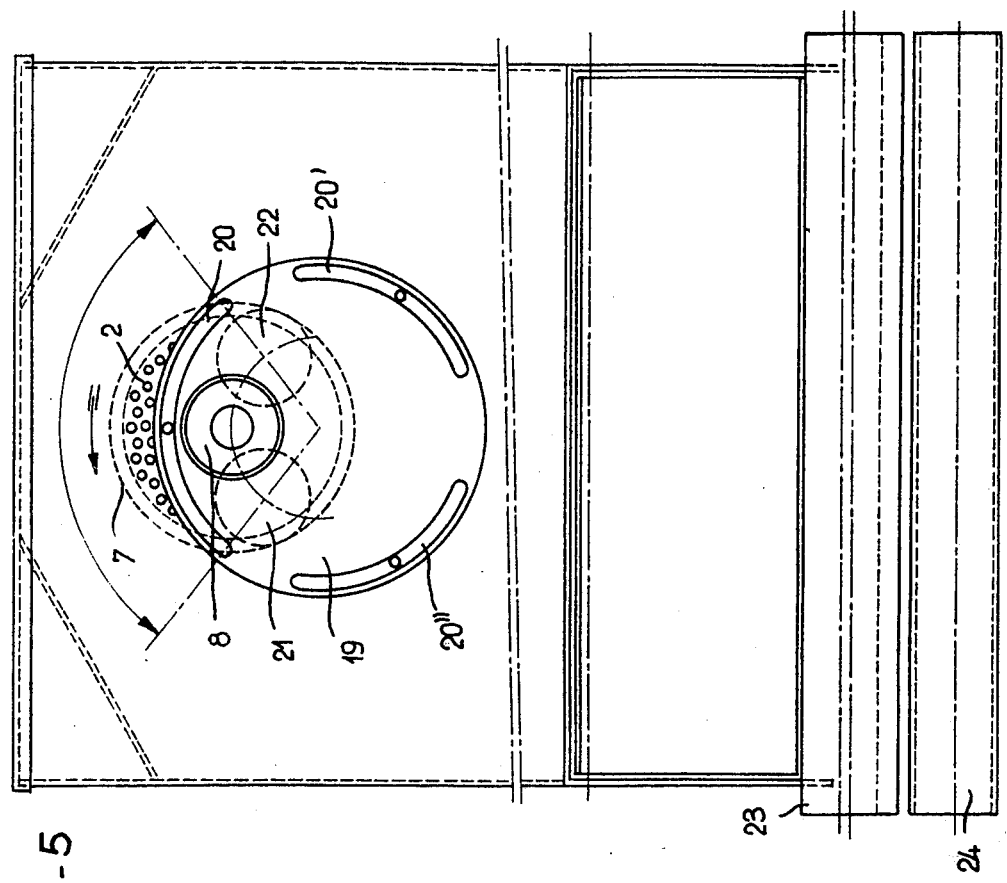
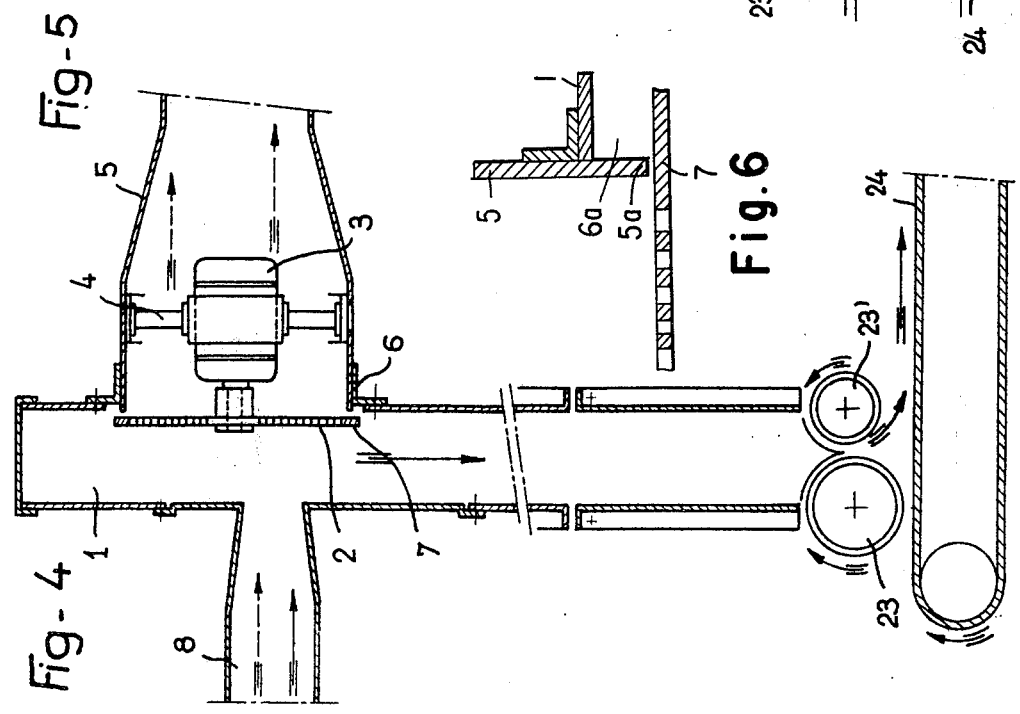

METHOD AND APPARATUS FOR SEPARATING AND DISTRIBUTING FIBROUS MATERIALS

This application is a continuation of U.S. Patent application Ser. No. 450,801 entitled Method and Apparatus for Separating and Distributing Fibrous Material, filed Mar. 13, 1974 by the applicant herein and now abandoned.

This invention provides a device and a method for uniformly distributing fibrous material into a silo while separating said material from the air flow used as a carrier medium therefor.

This separator-distributor comprises essentially a rotary perforated disc associated with preferably pneumatic conveyor means for causing the material to impinge against the surface of said disc and, through the combined action of the impact thus produced between the material and the rotary disc and the centrifugal force generated by the relatively high rotational speed of the disc, dividing, dispersing and eventually discharging the fibrous material uniformly into the silo.

This device is particularly advantageous for preparing mats or sheets of fibrous material which have a relatively low density or weight per surface unit, as well as a relatively high degree of uniformity and regularity, notably for the continuous and automatic supply of mat to textile machines.

The present invention relates to methods or and means for separating from an air flow, dividing and dispersing uniformly within a silo, fibrous materials of any type as delivered from one or a plurality of feed machines, in order to form according to requirements a mat of relatively low or relatively high density, of reduced or large width, for feeding in turn either a single textile machine or a plurality of textile machines, for example a card.

Silos are already known wherein the fibrous material from a pneumatic conveyor duct is introduced by separators-distributors into the silos by using mechanical and/or pneumatic means.

To this end, a pneumatic duct or conduit common to a group of silos conveys the fibrous material towards the inlet opening of each silo equipped with pick-up and discharge means consisting essentially of separators-distributors comprising as a rule:

either a paddle-wheel rotatably mounted in a housing, or a rotary condenser (consisting of perforated sheet metal in certain cases), or a combination of these two systems.

Apparatus for building up mats of the type set forth hereinabove are also known which comprise a multiple number of silos connected directly to a common pneumatic conveying duct or conduit of a width consistent with that of said silos. In apparatus of this type the filling action is obtained by using deflectors. To this end, these deflectors, disposed in front of the silo inlet ports or openings, extend partially within the conveyor conduit and are inclined in a direction opposed to the direction of flow of the carrier air stream and of the fibrous material conveyed thereby; as a result, the fibrous material in suspension in said air stream is deflected continuously into the silos.

It may be mentioned as a reminder that apparatus are already known which comprise a conveyor belt onto which the fibrous material is discharged continuously, this conveyor belt travelling at a level corresponding substantially to the silo top. The only original feature characterising these arrangements lies in the fact that they combine blowing means with a level detector for forcing the material into the silos.

However, a common inconvenience characterising these various mat forming system is that, due to their inherent operating principle, the rate of feed of the material is reduced at each pick-up or deflection point, thus causing the fibres to agglutinate and thus form "lumps". These lumps are highly objectionable because they are a cause of irregular flow, since the slipping thereof along the inner walls of the silos is more or less impaired according to their volume.

It is known in the art that a primary requirement of the mat issuing from a volumetric feed device is that its weight per unit length and unit width must be as uniform or regular as possible. It is also known that this uniformity or regularity depends on the uniformity of the degree of looseness of the material discharged into the silos. Therefore, all efforts should be directed towards a positive attenuation of the detrimental effects resulting from the fibre agglutination.

To this end, known silos are provided with means capable of improving the homogeneity of the mats of material. These means are designed essentially for:

exerting a continuous pneumatic pressure on the column of material assuming the configuration of the inner contours of the silos, vibrating the silo walls to facilitate the slipping of the column of siloed material, and imparting up- and downward movements to the column of material by means of beating blades or shutters disposed in the lower portion of the silos.

In fact, the regularity of the mat issuing from a silo can be positively enhanced by these various means; in contrast thereto, due to the ramming action exerted on the fibres it is not possible to obtain a thin and low-density mat.

Considering their limited lateral distributing capacity, known separators-distributors can be used only for discharging fibrous material into silos of medium width capable of forming mats or like sheets for the automatic feeding of textile machines such as cotton-type cards, but not under no circumstances, for feeding wool-type cards having a working width of 80 to 100 inches or more.

Generally, wide-roll machines of this specific type are fed either from weighing-loaders or loaders equipped with a silo of moderate height.

Weighing-loaders are objectionable in that they deposit irregular layers of fibrous material transversely to the working width of the card; as a result, furrows develop in the resulting web, a flaw unacceptable especially in the production of web for making non-woven fabrics. In any case, the possibilities of properly operating such weighing-loaders for feeding cards are rather limited, since the rate of operation of the weighing means cannot meet the production requirements of these cards, which ranges as a rule from 440 to 660 pounds per hour.

The chief inconvenience of loaders incorporating a silo lies in the fact that due to the reduced height of the silo its fibrous material capacity is out of proportion with the rate at which the fibres are extracted therefrom, so that the weight of the siloed column of material is no more effective as a regulating element. Consequently, to obtain sufficiently regular mats, it is necessary to couple a plurality of these machines with one another, this obviously constituting a serious inconvenience for these sets are extremely combersome and expensive, where it is only because a considerably number of ancillary devices are necessary for operating them.

It is therefore a primary object of the present invention to avoid these various inconveniences by providing a method of separating and distributing fibrous material for the purpose set forth and also apparatus for carrying out this method, which incorporates essentially a separator-distributor, this invention being characterised notably in that means, preferably of pneumatic character, for conveying the fibrous material are associated with other means capable of exerting a suction on this material by producing a depression directed through at least one perforated rotary member against which the fibrous material is caused to impinger, so that the following combined actions take place simultaneously:

i. separating the fibrous material from the air flow used as a carrier medium, due to the suction exerted through the perforations of said rotary member, and ii. dividing, dispersing and eventually discharging said material uniformly into a chamber, for example a silo, by means of the combined actions of the impact applied to the fibrous material as it is thrown against said rotary member and of the centrifugal force generated by the relatively high rotational speed of said rotary member.

To this end, at least one perforated disc driven at a high rotational speed is exposed to a suction produced by a fan. The fibrous material is fed normally to the disc surface. Thus, the material is caused to impinge against one portion of the disc surface; as a result, the agglutinated fibrous material is disintegrated and then dispersed by the centrifugal force generated by the high-speed rotation of the perforated disc.

According to another feature characterising this invention the dispersion effect may be adapted to the degree of looseness and also to the specific nature of the treated fibres, and also to the width of the silos, by taking advantage of the centrifugal force generated by the rotation of said perforated disc, which varies as a function of the distance from the disc centre.

To this end, the duct supplying the fibrous material is carried by a disc displaceable along an arcuate path between two limit positions disposed symmetrically to a vertical axis comprising both the centre of said perforated disc and the centre of the adjustment means. These two positions are such that the geometrical projection of the material supply duct on the perforated disc is in either case a circle internally tangent to said disc. With this arrangement it is possible to direct the fibrous material either to the centre or to the outer periphery of the perforated disc, or in any intermediate position therebetween.

According to other features characterising this invention:

a multiple number of rotary perforated discs may be used for discharging and dispersing the fibrous material in a common silo. To this end, said disc may be disposed either side by side or in face to face relationship, with opposite directions of rotation.

likwise, each perforated disc may be associated with a plurality of ducts for introducing the fibrous material, these ducts having different characteristics.

The apparatus for carrying out the method of this invention is characterised notably in that the fluid tightness between the perforated disc and the suction conduit associated therewith is obtained by means of an aerodynamic seal formed between an annular imperforate surface portion of the high-speed rotary disc and the inlet aperture of its suction conduit adjusted for this purpose to be as close as possible to the aforesaid imperforate annular surface portion.

Other features and ancillary advantages of this invention will appear as the following description of a few exemplary forms of embodiment proceeds with reference to the attached drawings, given by way of illustration, now of limitation.

In the drawings:

FIG. 4 is a vertical section showing a silo of relatively great width illustrating a typical mounting of the separator-distributor of FIG. 1;

FIG. 5 is an elevational view showing the rear portion of the silo of FIG. 4, with the means for adjusting the radial position of the duct in relation to the perforated disc; and FIG. 6 shows a part of the silo of FIG. 1, in enlarged detail, to illustrate the action of the aerodynamic seal between the disc and the conduit.

Figure 1:
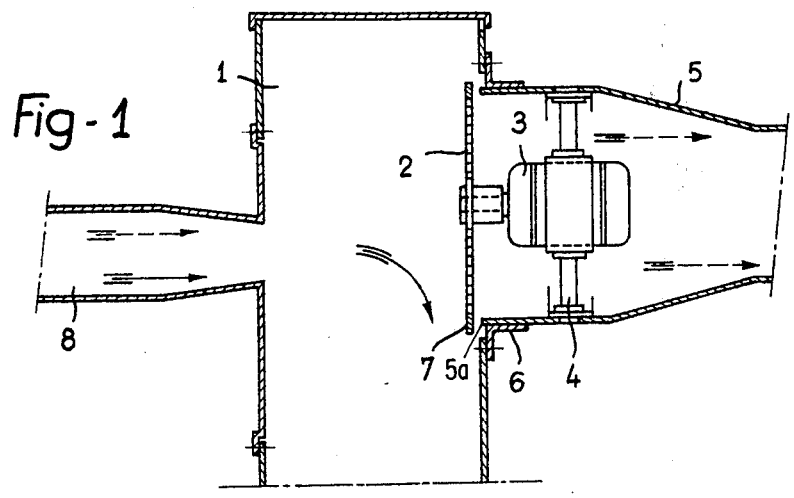
FIG. 1 is a diagrammatic vertical axial section showing a typical separator-distributor according to this invention.

Referring first to FIG. 1, it will be seen that the upper portion 1 of a silo is equipped with a separator-distributor comprising essentially a perforated disc 2 carried by the shaft of an electric motor 3 mounted in turn by support means 4 within a conduit 5 connected to a suction source (not shown). The motor and conduit assembly is secured by a flange to the rear wall of the silo in alignment with an aperture formed therein to this end. The end or edge 5a of conduit projects slightly within the outlet aperture of the silo 1 and is disposed as close as practically possible to the outer peripheral annular imperforate surface portion 7 of disc 2. A feed duct 8 perpendicular to the surface of disc 2 has a convergent tapered end connected to the front wall of the silo 1. Thus, when the disc 2 rotates an aerodynamic seal is provided in an annular duct 6a formed between the end portion 5a of the suction conduit 5 projecting in the silo, the annular imperforate portion 7 of disc 2 and the inner face of the wall of the silo 1, to provide a fluid tight seal between the disc 2 and the conduit 5, as best shown in FIG. 6.

Figure 2:
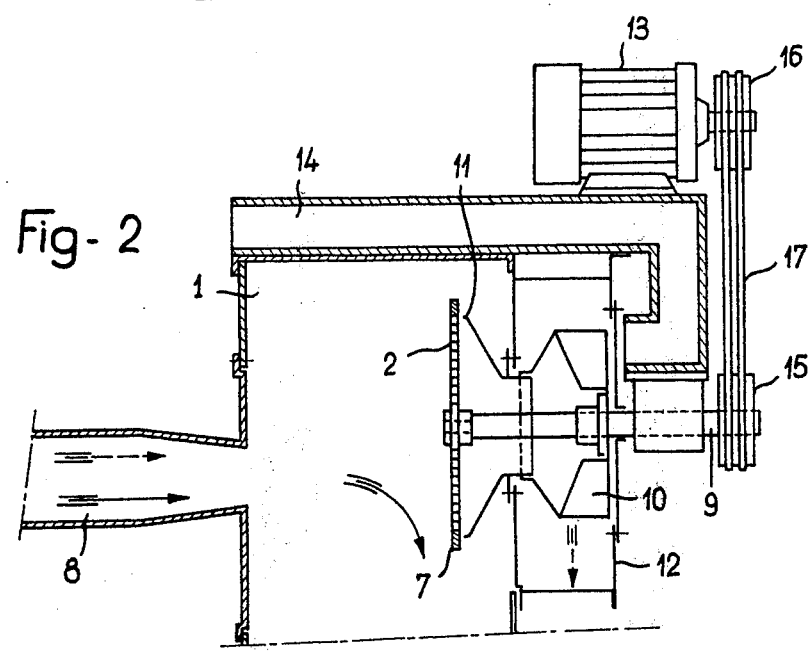
FIG. 2 is a view similar to FIG. 1 but showing a modified form of embodiment of the means for rotatably driving the perforated disc.

In FIG. 2 the separator-distributor illustrated comprises a built-in suction fan. To this end, the perforated disc 2 is secured to a shaft 9 together with a fan rotor 10 of which the suction housing has a divergent extension 11 secured to the scroll 12 of said fan rotor 10. An electric motor 13 supported by and secured to a bracket or like support 14 is drivingly connected via a transmission comprising grooved pulleys 15, 16 and V-belts 17 to the shaft 9.

Figure 3:
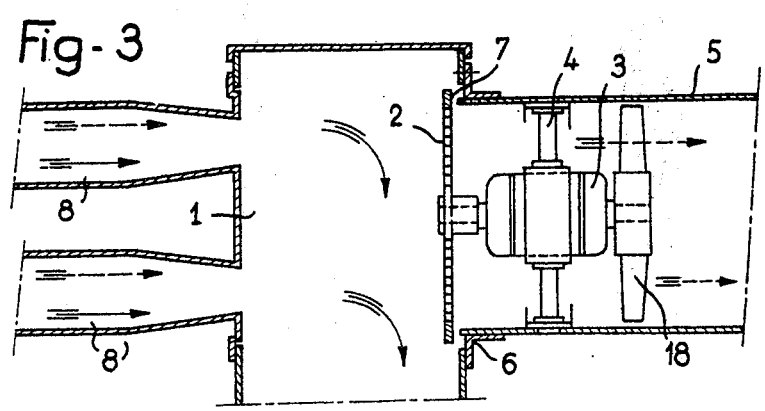
FIG. 3 is another view similar to FIGS. 1 and 2; showing the rotary perforated disc associated with a pair of ducts for supplying the fibrous material.

FIG. 3 illustrates a modified form of embodiment comprising two feed ducts 8, 8' for supplying fibrous material; these ducts 8, 8' are so directed that the material issuing therefrom impinge against the upper and lower portions of the perforated disc 2 rigidly mounted to the shaft of motor 3, this shaft having a rear extension rigid with a helical suction fan 18.

FIGS. 4 and 5 illustrate typical embodiments of the means for discharging fibrous materials into a feed silo of relatively great width, according to the teachings of the present invention.

As illustrated in FIG. 4, the silo 1 comprises in its upper portion a separator-distributor of the type shown in FIG. 1, and in its lower portion a pair of delivery cylinders 23 and 23' co-acting with an endless conveyor belt 24.

The material delivery port of duct 8 shown in FIG. 5 is rigid with an adjustment disc 19 having its axis parallel, but off-set in relation to the shaft of motor 3. This disc 19 is provided with studs, rolls or fingers engaging arcuate slots 20, 20' and 20" concentric to the disc 19 between two limit or end positions 21 and 22, so that the dispersion effect can advantageously be adapted to the port opening and to the specific type of fibrous material to be treated, and also to the useful width of the silo 1.

This apparatus operates as follows

The fibrous material collected at the outlet of the supply machine (not shown) is forced along the feed duct 8 and caused to impinge the perforated disc 2. Preferably but not compulsorily, the rotational speed of disc 2 is of the order of 60 m/sec (200 ft/sec). As a consequence of the impact produced between the fibres and the disc 2, the agglutinated fibres are divided and separated with force, and subsequently discharged and dispersed with a considerable uniformity into the silo or silos. With this process a very homogeneous and regular mat or sheet is obtained, both in length and width. This mat or sheet is removed from the silo 1 by means of cylinder extractors 23, 23' and fed onto an endless conveyor belt 24 directing the fibre mat for subsequent treatment in a textile or other machine, for example a card.

Since the air current or blast used for conveying the fibrous material is exhausted through conduit 5 by the suction exerted through the perforated disc, it is an easy matter to adjust at will the weight per surface unit of the resultant mat, as required, by simply changing the ratio of the forced air to the sucked air. In fact, the upper portion of the chamber consisting of the silo 1 can thus be put either under pressure, or in a state of equilibrium, or under vacuum in relation to the lower portion of the silo, and this constitutes a particularly advantageous feature of the method and apparatus of this invention.

Although specific forms of embodiment of this invention have been described hereinabove and illustrated in the accompanying drawings, it will readily occur to those skilled in the art that various modifications and changes may be brought thereto without departing from the scope of the invention as set forth in the appended claims.

What is claimed as new is:

1. Apparatus for separating and collecting fibrous material from a pneumatically conveyed air-fibrous material mixture, comprising, in combination, storage means having a side wall defining an interior for storing fibrous material, said storage means being provided with an inlet and an outlet in said side wall, a flat disc mounted for rotation on a horizontal axis in said storage means interior adjacent said outlet, said disc having a perforated portion provided with a plurality of perforations extending radially outward from said axis and terminating radially inward of the outer periphery of said disc and an imperforate, annular edge portion on said disc extending circumferentially between said perforated portion and said disc outer periphery, means for rotating said disc, conduit means connected to said storage means inlet for conducting the pneumatically conveyed air-fibrous material mixture into said storage means interior along a path normal to said disc for impingement of said air-fibrous material mixture on said rotating disc, a suction conduit connected at one end to said storage means outlet and to said side wall, said conduit one end edge projecting into said storage means interior and being at an end edge disposed in closely spaced relationship with said imperforate portion inwardly of the outer periphery of said disc and to provide during the rotation of said disc an aerodynamic seal formed in an annular duct defined between said annular imperforate portion of the rotary disc, the inner surface of said side wall and the outer surface near the edge of said suction conduit, pneumatic suction means associated with said suction conduit for drawing the air from said air-fibrous material mixture impinging on said rotating disc through said disc perforated portion and to permit the fibrous material in the mixture from which said air is drawn to be deposited in said storage means with the passage of air between said rotating disc and said edge of said suction conduit one end being prevented by said aerodynamic seal.

2. Apparatus in accordance with claim 1 including a shutter-forming disc, means for mounting said shutter-forming disc on said storage means adjacent said inlet for movement along a circular path between two limit positions, and wherein said conduit means includes a duct supported on said shutter-forming disc whereby movement of said shutter-forming disc between said two limit positions permits the introduction of said air-fibrous material mixture through said duct along a selected path for impingement of said mixture on a selected area of said rotating disc along an arcuate path extending through the central axis of said rotating disc.

3. Apparatus in accordance with claim 1 wherein said conduit means includes a plurality of ducts connected to said storage means inlet, each of said ducts being arranged to conduct a pneumatically conveyed air-fibrous material mixture into said storage means interior along a path normal to said rotating disc.

4. Apparatus in accordance with claim 1 wherein said pneumatic suction means includes a suction fan operatively associated with said outlet conduit.

5. Apparatus in accordance with claim 1 wherein said means for rotating said disc includes a motor having a shaft and means for securing said disc to said motor shaft and wherein said pneumatic suction means includes a fan blade secured to said motor shaft on the opposite side of said motor from said rotating disc.

6. Apparatus in accordance with claim 1 wherein said means for rotating said disc includes a motor, a rotatably supported shaft drivably connected to said motor, means for mounting said rotating disc on said shaft and wherein said pneumatic suction means includes a fan blade mounted on said shaft and wherein said outlet conduit includes a scroll having a suction opening associated with said fan blade and a divergent extension mounted in communication with the suction opening of said fan scroll and having one end disposed adjacent to said disc imperforate portion for forming said aerodynamic seal.

* * * * *